United States Patent [19]

Deluca et al.

[11] Patent Number: 5,784,001
[45] Date of Patent: Jul. 21, 1998

[54] METHOD AND APPARATUS FOR PRESENTING GRAPHIC MESSAGES IN A DATA COMMUNICATION RECEIVER

[75] Inventors: Joan Deluca, Boca Raton; Douglas Kraul, Parkland; Charles Edward Batey, Jr., Lake Worth, all of Fla.

[73] Assignee: Motorola, Inc., Schaumburg, Ill.

[21] Appl. No.: 898,640

[22] Filed: Jul. 21, 1997

Related U.S. Application Data

[63] Continuation of Ser. No. 560,604, Nov. 20, 1995, abandoned.

[51] Int. Cl.⁶ ................................................. G08B 5/22
[52] U.S. Cl. ................................. 340/825.44; 345/133
[58] Field of Search ....................... 340/825.44; 345/133, 345/122

[56] References Cited

U.S. PATENT DOCUMENTS

| | | | |
|---|---|---|---|
| 4,330,780 | 5/1982 | Masaki | 340/825.44 |
| 4,336,524 | 6/1982 | Levine | 340/825.44 |
| 4,429,306 | 1/1984 | Macauley et al. | 345/195 |
| 4,704,608 | 11/1987 | Sato et al. | 340/825.44 |
| 4,713,808 | 12/1987 | Gaskill et al. | 340/825.44 |
| 4,860,005 | 8/1989 | De Luca et al. | 340/825.44 |
| 4,870,402 | 9/1989 | Deluca et al. | 340/825.44 |
| 4,951,039 | 8/1990 | Schwendeman | 340/825.44 |
| 5,157,391 | 10/1992 | Weitzen | 340/825.44 |
| 5,182,553 | 1/1993 | Kung | 340/825.44 |
| 5,212,721 | 5/1993 | Deluca et al. | 379/57 |
| 5,223,831 | 6/1993 | Kung et al. | 340/825.44 |
| 5,257,307 | 10/1993 | Ise | 340/825.44 |
| 5,347,269 | 9/1994 | Vanden Heuvel et al. | 340/825.44 |
| 5,452,356 | 9/1995 | Albert | 340/825.44 |
| 5,512,916 | 4/1996 | Merchant et al. | 340/825.44 |
| 5,561,702 | 10/1996 | Lipp et al. | 340/825.44 |
| 5,574,439 | 11/1996 | Miyashita | 340/825.44 |

FOREIGN PATENT DOCUMENTS

| | | | |
|---|---|---|---|
| 0 393 794 A1 | 4/1990 | European Pat. Off. | G08B 5/22 |
| 55-34710 (A) | 3/1980 | Japan . | |
| 2 197 103 | 5/1988 | United Kingdom | H04B 5/04 |
| 2 206 718 | 1/1989 | United Kingdom | H04B 5/04 |
| 9103885 | 3/1991 | WIPO | 455/154 |

Primary Examiner—Brian Zimmerman
Assistant Examiner—Edward Merz

[57] ABSTRACT

A data communication receiver (100) includes a receiver (110) for receiving a message including at least one code, a database (155) for storing codes and image data associated with the codes, and a presentation element (150) for locating the at least one code in the database (155). The presentation element (150) then retrieves the image data associated with the at least one code. The image data associated with the at least one code is representative of at least one image. The data communication receiver (100) also includes a display (130) coupled to the presentation element (150) for presenting the at least one image as a graphic message.

6 Claims, 8 Drawing Sheets

| CODE | IMAGE |
|---|---|
| #01 | TELEPHONE |
| #02 | HOUSE |
| #03 | OFFICE |
| #04 | FAMILY |
| #05 | TRAIN |
| #06 | PERSON RUNNING |
| #07 | COFFEE MUG |
| #08 | CLOCK FOLLOWED BY TIME |
| #09 | FOOD PLATTER |

*155*

*130*

| CODE | IMAGE |
|---|---|
| #01 | TELEPHONE |
| #02 | HOUSE |
| #03 | OFFICE |
| #04 | FAMILY |
| #05 | TRAIN |
| #06 | PERSON RUNNING |
| #07 | COFFEE MUG |
| #08 | CLOCK FOLLOWED BY TIME |
| #09 | FOOD PLATTER |

155

| KEY WORD | IMAGE |
|---|---|
| CALL, PHONE | TELEPHONE |
| COFFEE, DRINK | COFFEE MUG |
| LUNCH, DINNER | PLATTER |
| SEND, MAIL | ENVELOPE |
*FIG. 14*
*FIG. 15*
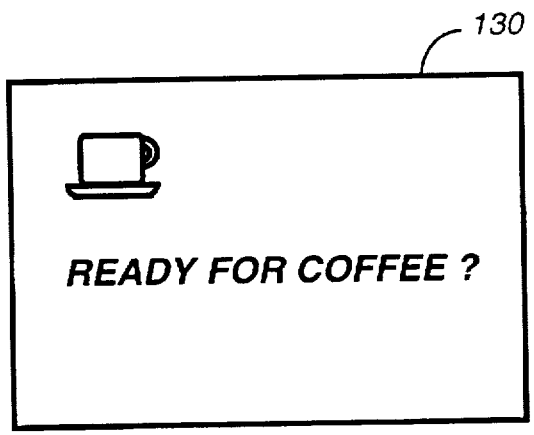
*FIG. 16*

METHOD AND APPARATUS FOR PRESENTING GRAPHIC MESSAGES IN A DATA COMMUNICATION RECEIVER

This is a continuation of application Ser. No. 08/560,604, filed Nov. 20, 1995 now abandoned.

FIELD OF THE INVENTION

This invention relates in general to data communication receivers having displays, and more specifically to data communication receivers that can display images.

BACKGROUND OF THE INVENTION

Selective call messages are generally originated by a person who wishes to contact the user of a data communication receiver. A message is usually provided to a paging terminal, then transmitted as a radio signal to the receiver. Once the data communication receiver has decoded and stored a message, message reception is announced to the user by, for example, an alert such as an audible tone or predetermined icon. For instance, some prior art devices include a standby display that presents a single, triangular icon for each stored message such that the user can determine the number of messages stored in the receiver. Data communication receivers employ predetermined icons to provide other information, e.g., low battery or out-of-range status, as well.

However, text, rather than icons, is conventionally utilized to present the actual content of received messages to a user of a data communication receiver. Data communication receivers that receive alphanumeric messages and the systems in which they are registered therefore usually are language-specific. As a result, a user who speaks a particular language is unable to understand received messages if he roams into a system in which messages are transmitted in a different language.

Thus, what is needed is a method and apparatus for providing selective call messages that are not language-specific.

BRIEF DESCRIPTION OF THE DRAWINGS

FIG. 14 is an example of key words and image data stored in the graphics database in accordance with the present invention.

FIGS. 15 and 16 are illustrations of supplemental graphic messages provided with text on the display of the data communication receiver of FIG. 1 in accordance with the present invention.

DESCRIPTION OF A PREFERRED EMBODIMENT

Figures 1, 2:
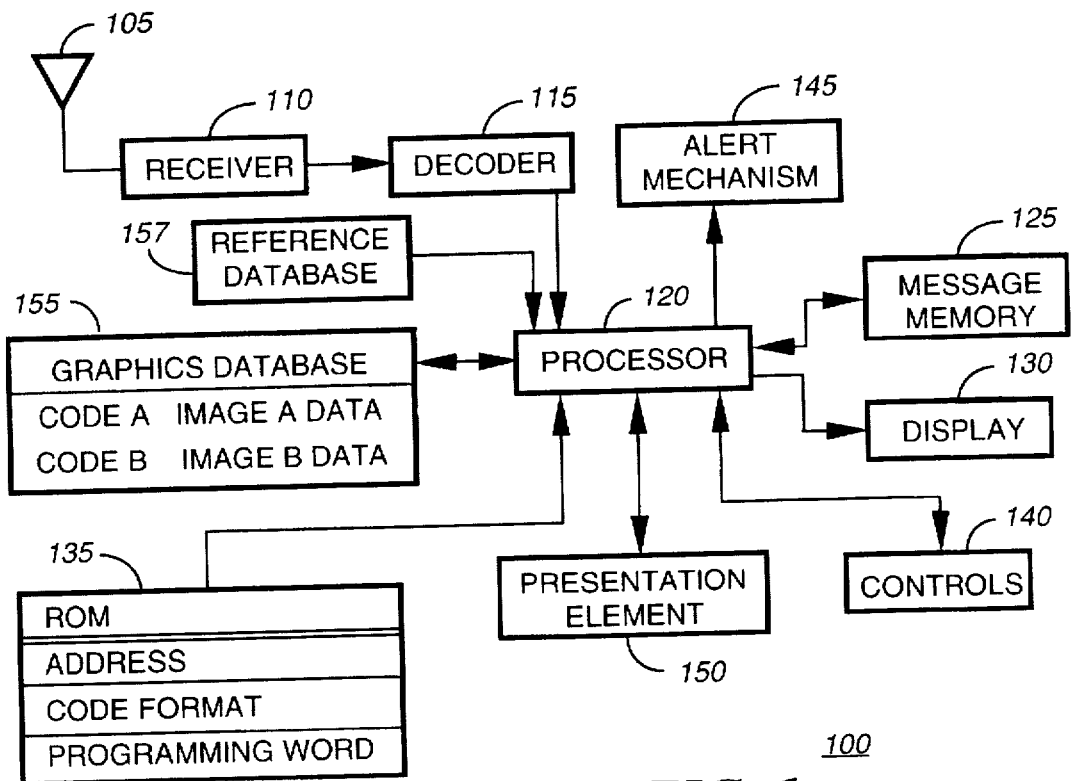
FIG. 1 is an electrical block diagram of a data communication receiver for presenting information in accordance with the present invention.
FIG. 2 is an example of codes and image data stored in a graphics database included in the data communication receiver of FIG. 1 in accordance with the present invention.

FIG. 1 is an electrical block diagram of a data communication receiver 100, such as a pager, that includes an antenna 105 for receiving a radio signal and a receiver 110 for demodulating the radio signal. A decoder 115 coupled to the receiver 110 recovers information, such as selective call messages and addresses, included in the demodulated signal. The data communication receiver 100 further includes a processor 120 for processing the recovered information and for determining whether an address in the signal is equivalent to a pager address preferably stored in a memory, such as a read only memory (ROM) 135. A matching address indicates that the message is intended for reception by the data communication receiver 100. The ROM 135 preferably also stores a code format and a programming word, as will be discussed in greater detail below. A message memory 125 is further included in the data communication receiver 100 for storing the received messages intended for reception by the data communication receiver 100. Controls 140 are coupled to the processor 120 for inputting user-initiated commands, such as a display command, and a display 130, such as a liquid crystal display, is coupled to the processor 120 for presenting information to the user. An alert mechanism 145 announces reception of a message to the user by generating an audible, vibratory, or visual alert.

According to the present invention, a presentation element 150 processes each received message to determine whether the message is to be presented graphically, i.e., whether the message comprises a "graphics message," the meaning of which is conveyed pictorially. Preferably, the data communication receiver 100 is able to receive both conventional alphanumeric messages and graphics messages, which are indicated by predetermined codes included in received messages.

By way of example, predetermined characters commonly found on conventional telephone receivers can be used to designate selected codes representative of predetermined graphic images. A message originator can therefore press the buttons associated with the codes to provide graphics information to a selective call terminal, which transmits the codes as a radio signal. When at least one predetermined code is recognized by the data communication receiver 100, a graphics message comprising one or more graphic images is presented to the user of the receiver 100. According to the present invention, the graphic message conveys, in pictures, a universally understood meaning to the user of the data communication receiver 100. The presentation element 150 is preferably implemented in firmware stored in the ROM 135. However, hardware capable of performing equivalent operations can alternatively be used to implement the presentation element 150.

The graphic images available for presenting graphic messages are preferably stored by the data communication receiver 100 in, for example, a graphics database 155. According to the present invention, the graphics database 155 stores a predetermined list of codes, i.e., one or more predetermined characters or a pattern of bits. Each code is associated with image data stored in the database 155. The codes and image data associated therewith can be programmed into the receiver 110 by means such as the controls 140, downloading through a data port (not shown), or over-the-air programming through use of the stored programming word. Therefore, additional codes and image data can be conveniently added to the graphics database 155 as the need for new graphic images arises. Other information to be displayed can be stored in a reference database 157 with cross-references to numeric information, as will be explained in greater detail below.

FIG. 2 is an example of entries in the graphics database 155. As shown, codes recognized by the receiver 100 as indicative of graphic messages begin with the "#" character, which is followed by two numeric characters. In this format, up to one-hundred codes, each associated with image data, could be programmed into the database 155. It will be appreciated, though, that any combination of any number of characters could be utilized to designate graphic messages, as long as the message originator is aware of the codes and the data communication receiver 100 can recognize the codes.

As shown, each code is associated with image data representative of a particular image. For example, code "#01" is associated with image data that represents the image of a telephone. "#02" is associated with a house, while "#03" is associated with an office. According to the present invention, reception of a display command for a received message including any of the stored codes will result in the presentation of the associated image or images on the display 130.

Figure 3:
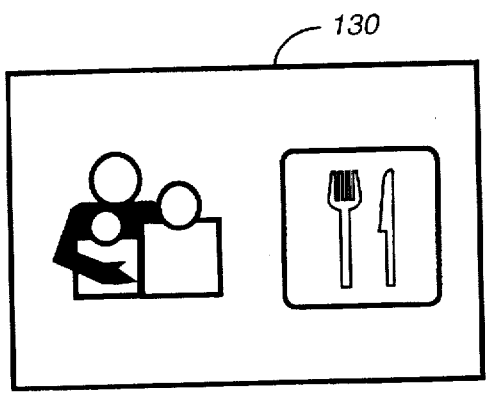
FIGS. 3-8 are illustrations depicting the presentation of graphic messages on a display of the data communication receiver of FIG. 1 in accordance with the present invention.
Figure 6:
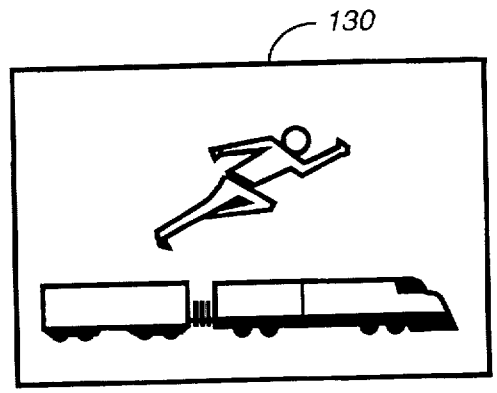
Figure 4:
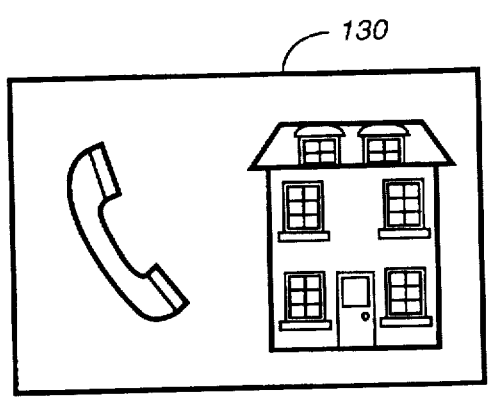
Figure 7:
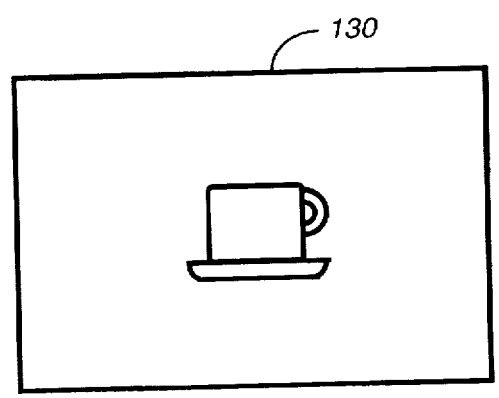
Figure 5:
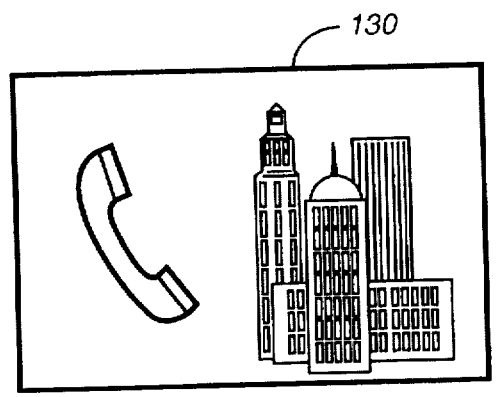

Referring next to FIGS. 3–8, illustrations of different graphic messages on the display 130 are shown. FIG. 3, for instance, illustrates the presentation of the graphic message "DINNER WITH FAMILY" in response to reception of the codes "#09#04." FIGS. 4 and 5 depict graphic messages indicating that the user should "CALL HOME" and "CALL THE OFFICE," respectively. In FIG. 5, reception of a display command for a message comprising the codes "#06#05" results in display of a graphic message that indicates "I AM GOING TO THE TRAIN." The graphic message of FIG. 7, associated with the code "#07," is understood to mean "LET'S GET COFFEE" OR "LET'S GET A DRINK."

Figure 8:
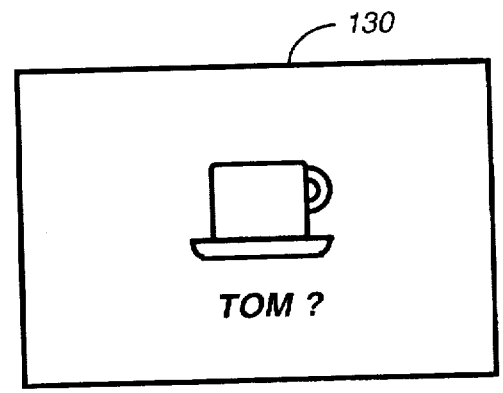

FIG. 8 illustrates the combination of both a graphic message and a text message including, for example, alphanumeric characters. Reception of a display command for a message comprising the characters of "#07TOM?" or "TOM?#07" results in the presentation of the image associated with the code "#07" as well as the presentation of any additional alphanumeric or numeric characters included in the message. As a result, graphic messages which need clarification can conveniently be supplemented by additional textual information presented substantially coincident with the graphic messages. For example, the user of a data communication receiver 100 may usually take a coffee break with his friend Bob. So, the display of a coffee mug with nothing more might indicate to the user that Bob is ready for coffee. When Tom wants to get coffee, he may therefore need to include additional information, such as his name, to avoid confusion.

There may be circumstances, however, in which the receiver 100 is capable of receiving only numeric information or the message originator can only send numeric information. In such a case, the originator, e.g., Tom, can send a code as well as his telephone number. The message could then comprise "#073331111" or "3331111#07." The codes, as mentioned, are preferably in one or more predetermined formats recognized by the receiver 100, so the receiver 100 will still recognize "#07" as the code indicative of the coffee mug. Additionally, the receiver 100 can then look up the remainder of the message in the reference database 157 to determine which other display information should be displayed along with the coffee mug icon. When "3331111" is located in the reference database 157, the display information corresponding thereto is displayed with the coffee mug. For example, display information associated with the telephone number "3331111" could result in presentation of the name "TOM" with the coffee mug image. When the number is not found in the reference database 157, the number itself is preferably displayed with the coffee mug icon. In this manner, alphanumeric information can be displayed or conveyed (through the displayed telephone number) even though only numeric information is sent and received.

Figure 9:
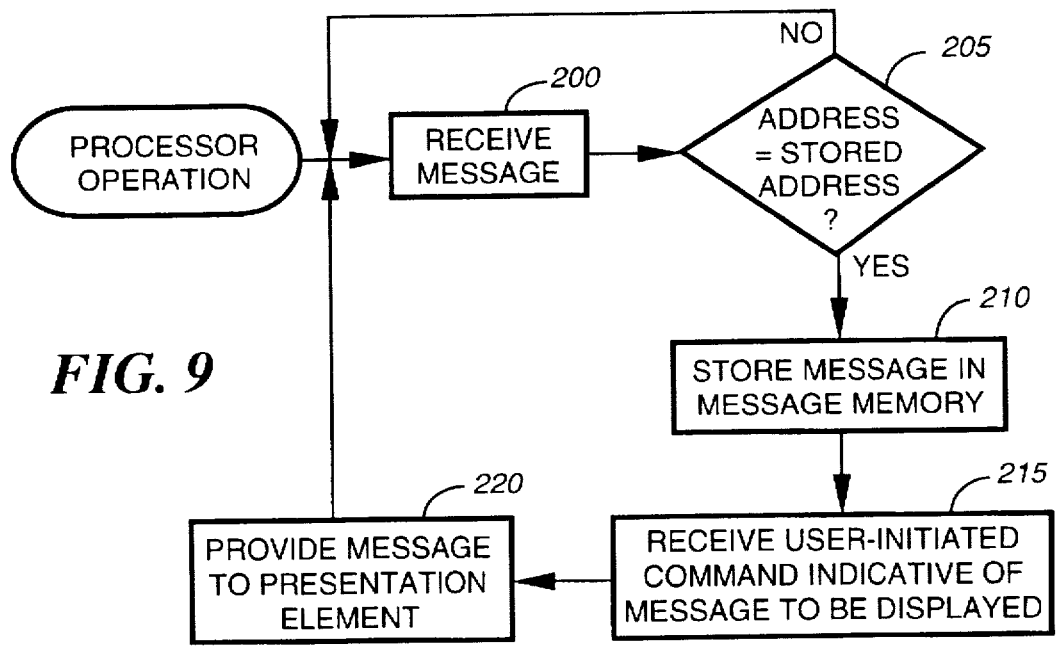
FIG. 9 is a flowchart depicting an operation of a processor included in the data communication receiver of FIG. 1 in accordance with the present invention.

FIG. 9 is a flowchart of an operation of the processor 120. At step 200, the processor 120 receives a message. When, at step 205, the received address is equivalent to the receiver address stored in the ROM 135 (FIG. 1), the message is stored, at step 210, in the message memory 125. When, at step 215, a user-initiated display command is received for the message, the message is provided to the presentation element 150, at step 220.

Figure 10:
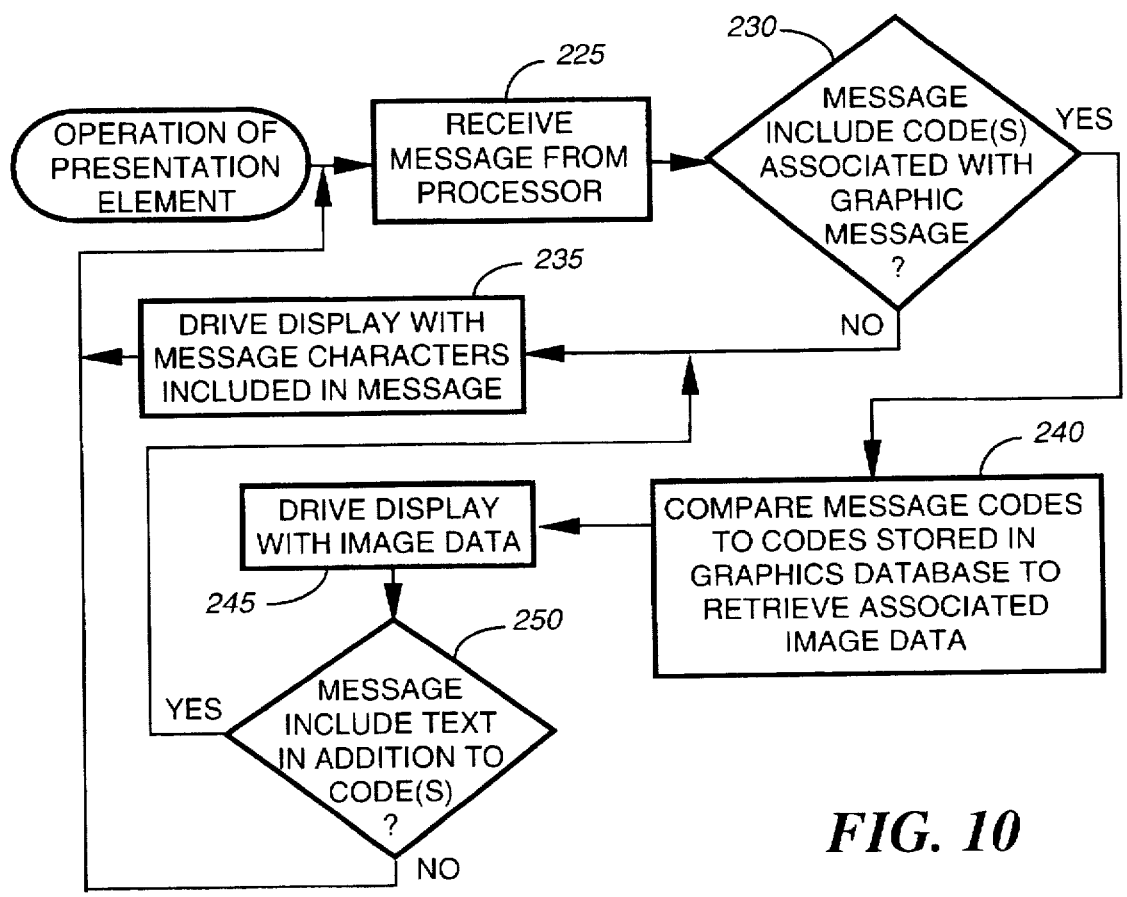
FIG. 10 is a flowchart depicting an operation of a presentation element included in the data communication receiver of FIG. 1 in accordance with the present invention.

Referring next to FIG. 10, an operation of the presentation element 150 in accordance with the present invention is depicted. When, at step 225, a message is received from the processor 120, the presentation element 150 determines, at step 230, whether the message includes at least one code associated with a graphic message. As mentioned, the codes associated with graphic messages are preferably in a predetermined format, such as a predetermined character, e.g., "#", followed by specific number of numerals. Therefore, the presentation element 150 can recognize a code associated with a graphic message by determining, with reference to the code format stored in the ROM 135, whether any characters included in the message are arranged in the predetermined code format. When the message does not include a code associated with a graphic message, the message is displayed, at step 235, in a conventional manner. In other words, the display 130 (FIG. 1) is driven with signals to generate the message characters on the display 130.

When, on the other hand, the message does include one or more codes associated with a graphic message, the presentation element 150 compares, at step 240, each code included in the message to the entries in the graphics database 155 (FIG. 1). When a code in the message is determined to be equivalent to a code in the database 155, the image data associated with the matching code is retrieved and used, at step 245, to drive the display 130, thereby presenting the image to the user. When, at step 250, the message includes text in addition to the graphic message code or codes, the additional text is also presented, at step 235.

In accordance with the present invention, the data communication receiver 100 can present the content of received messages to a user by displaying a graphic image or a sequence of graphic images. The graphic images can fully replace a text message so that a universally understood message is presented pictorially to a user. As a result, a user of the receiver 100 can understand a presented message regardless of his language. The presentation of a telephone image and an office image, for example, is likely to be understood as "CALL THE OFFICE" regardless of the language of the user. In this manner, a sequence of two or more graphic images can be easily combined to convey messages to any user. An advantage of the present invention, therefore, is that a person who roams into a geographic region in which a different language is spoken can still receive messages that are easily understood. Also, persons who speak one language can advantageously receive and understand messages that are originated by speakers of different languages.

Figure 11:
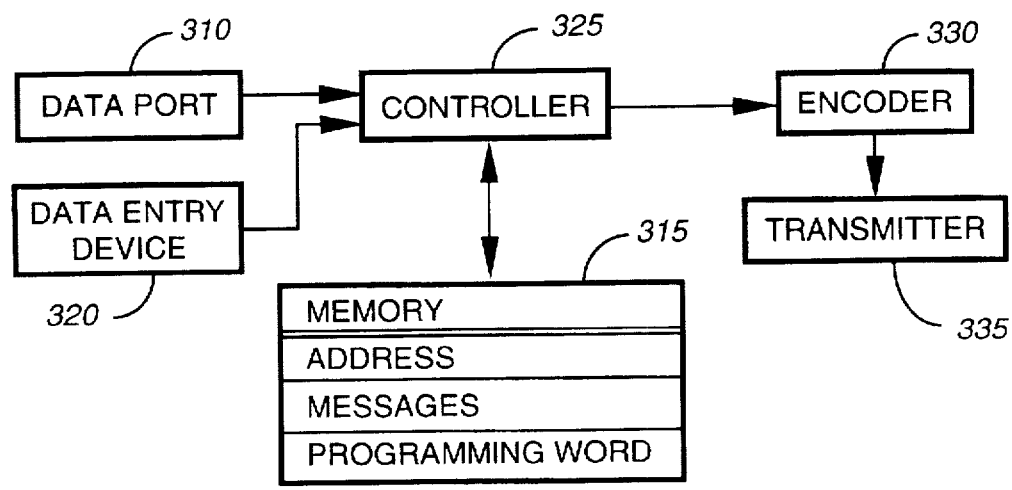
FIG. 11 is an electrical block diagram of a terminal for providing information to the data communication receiver of FIG. 1 in accordance with the present invention.

FIG. 11 is an electrical block diagram of a terminal 305 included in a communication system for transmitting information to the data communication receiver 100. The terminal 305 preferably includes a data port 310, such as a telephone interface, for receiving messages from message originators and a memory 315 for storing the messages until transmission. The memory 315 also stores addresses associated with data communication receivers, including the data communication receiver 100, that receive messages within the communication system and, when over-the-air programming of data communication receivers is desired, a programming word indicative of programming information. A data entry device 320, such as a keyboard, data port, or modem, provides user inputs so that an operator can update the addresses of the data communication receivers, add subscribers, or program data communication receivers.

A controller 325 coupled to the data port 310, the data entry device 320, and the memory 315 controls the operation of the terminal 305. The terminal 305 further comprises an encoder 330 for encoding messages and addresses using a communication protocol such as the conventional FLEX™ protocol and a transmitter 335 for transmitting the encoded information as a radio signal.

According to the present invention, the codes and the images used by the data communication receiver 100 in forming graphic messages can be programmed to update images or to provide additional images. Programming can be accomplished by direct entry of information by the controls 140 (FIG. 1) of the data communication receiver 100, by over-the-air programming, or by any other means for providing information to the data communication receiver 100.

Figure 12:
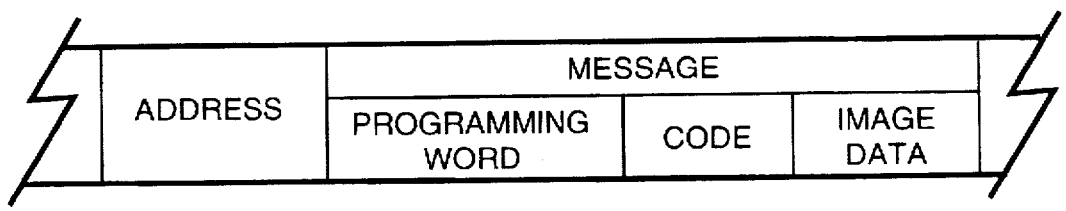
FIG. 12 is a signal diagram depicting an example of a programming message transmitted by the terminal of FIG. 11 to the data communication receiver of FIG. 1 in accordance with the present invention.

FIG. 12 is a signal diagram of a radio signal which can be transmitted by the terminal 305 to the data communication receiver 100 for programming new or enhanced images. As shown, the radio signal comprises the address of data communication receiver 100 followed by a programming message, which includes the predetermined programming word stored both by the terminal 305 and the data communication receiver 100. The programming word, which indicates to the data communication receiver 100 that the information appended to the word is to be utilized for programming the graphic database 155, preferably includes a predetermined character or sequence of characters. The message also includes a code, either existing or new, followed by image data to be written into the graphics database 155. Therefore, as graphics technology results in higher resolution graphics that are more easily understood, new image data can be provided to the data communication receiver 100.

Figure 13:
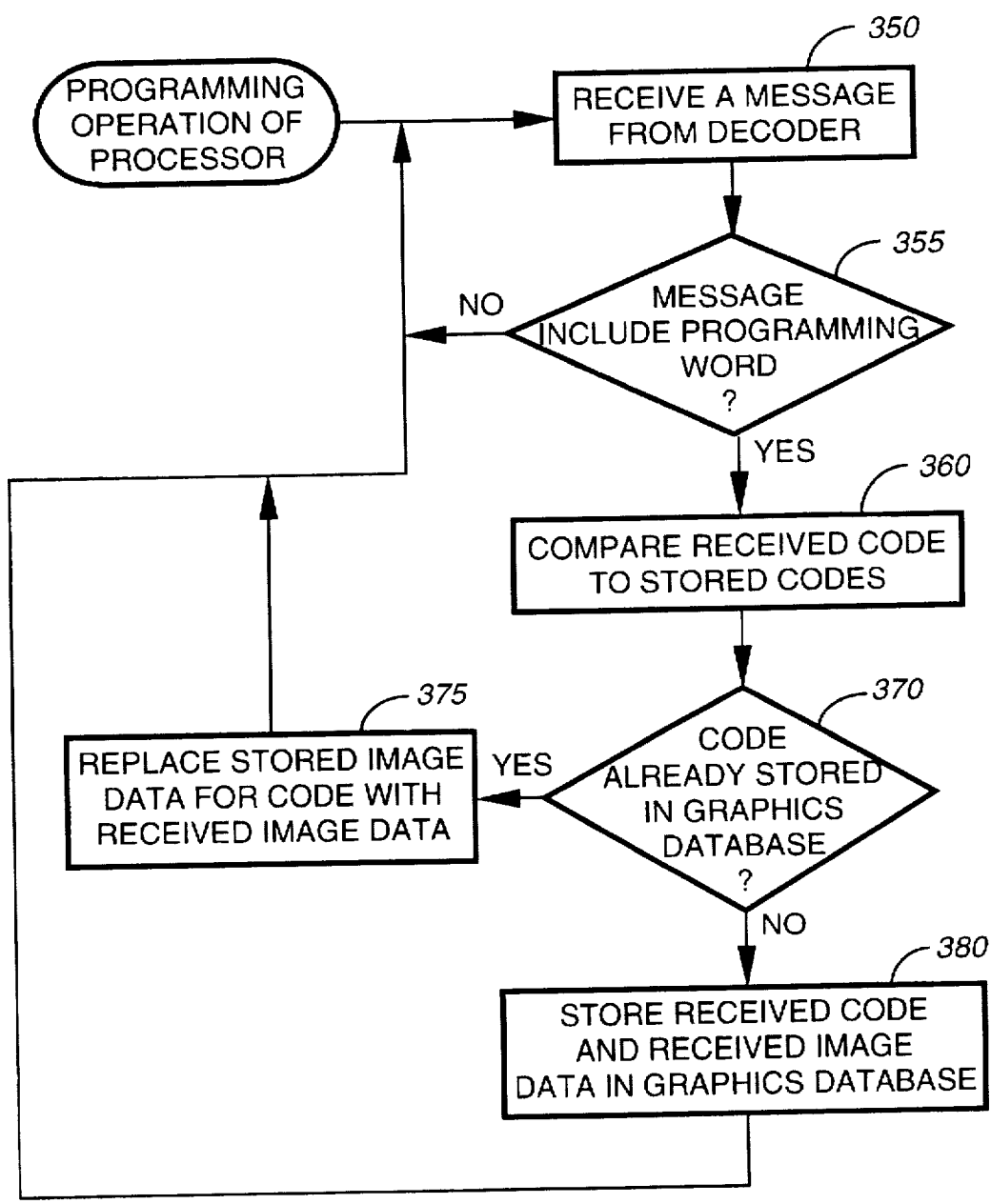
FIG. 13 is a flowchart depicting a programming operation of the processor of the data communication receiver of FIG. 1 in accordance with the present invention.

FIG. 13 is a flowchart depicting a programming operation of the processor 120 (FIG. 1) according to the present invention. When, at step 350, a message is received by the processor 120 from the decoder 115, the processor 120 determines, at step 355, whether the message includes the programming word indicative of over-the-air programming. When the programming word is located, the received code is compared, at step 360, with codes stored in the graphics database 155. When, at step 370, the received code already exists in the database 155, the received image data overwrites the image data already stored in the graphics database 155, at step 375. When the received code is not found in the graphics database 155, the processor 120 stores, at step 380, both the received code and the received image data in the database 155. Although over-the-air programming is not the exclusive method for programming the data communication receiver 100, such a method provides for convenient dissemination of programming information without requiring that each user bring his or her data communication receiver into a service center for individual reprogramming.

FIG. 14 is an example of entries in a graphics database 500 in accordance with an alternate embodiment of the present invention. According to the alternate embodiment of the present invention, the data communication receiver 100 recognizes key words in conventional messages then, when the messages are displayed, images associated with the key words are displayed as well to supplement the message. For example, key words such as "CALL" and "PHONE" can be associated with the image of a telephone. Therefore, when a message includes the words "CALL" or "PHONE", the message would be displayed as text along with a supplemental image of a telephone, as shown in the illustration of FIG. 15. FIG. 16 illustrates the display of the text message "READY FOR COFFEE?" along with a supplemental image of a coffee mug. According to the alternate embodiment of the present invention, the presence of the key word "COFFEE" in the received message triggers the display of the coffee mug image.

Figure 17:
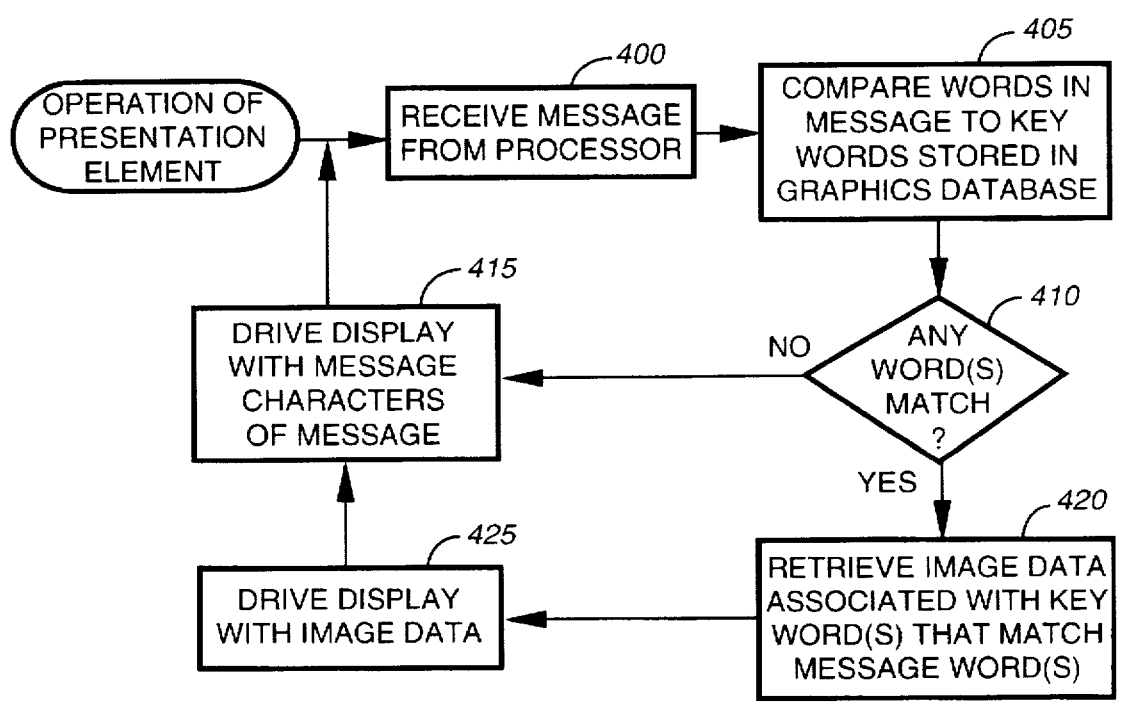
FIG. 17 is a flowchart depicting another operation of the presentation element included in the data communication receiver of FIG. 1 in accordance with the present invention.

Referring next to FIG. 17, a flowchart depicts an operation of the presentation element 150 according to the alternate embodiment of the present invention. At step 400, the presentation element 150 receives a message from the processor 120 and then, at step 405, compares the words of the message with the key words stored in the graphics database 500. When, at step 410, no words match, the message is displayed, at step 415, in a conventional manner. When one or more message words are equivalent to key words in the graphics database 500, the image data associated with the key word or words is retrieved, at step 420, from the database 500. Thereafter, at steps 415, 425, the display 130 is driven to display both the message text and the supplemental image.

According to an alternate embodiment of the present invention, the graphics database 155 (FIG. 1) additionally stores database information about the different graphic images that can be displayed. This information augments universally-understood graphic messages and can be accessed via selection of a displayed image by the user. For example, the user could select a displayed image by touch-pad technology, i.e., by touching the image on the display 130, or by operating controls 140 to move a cursor to highlight a displayed image. Examples of information that can be displayed are shown in FIGS. 18–23.

Figure 18:
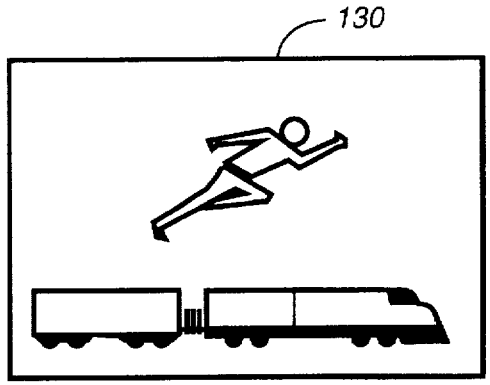
FIGS. 18-23 are illustrations further depicting the presentation of graphic messages on a display of the data communication receiver of FIG. 1 in accordance with the present invention.
Figure 19:
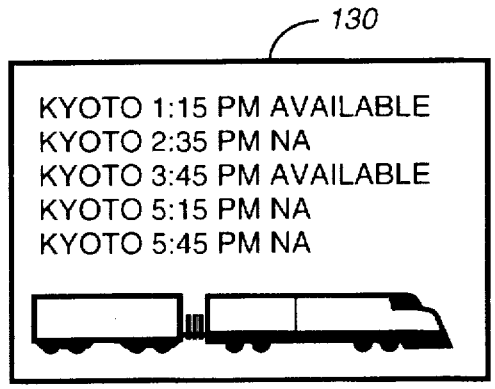
Figure 20:
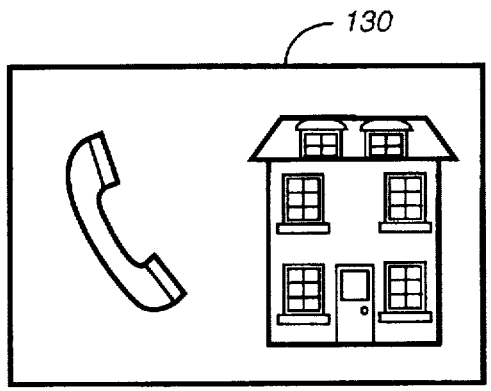
Figure 21:
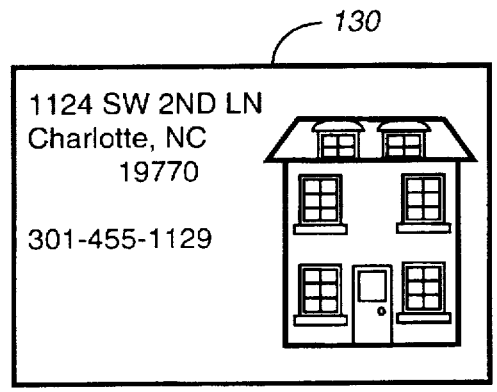

In FIG. 18, the "person running" icon and the "train" icon are displayed to indicate that a particular person is traveling by train or to a train. When the user selects the train icon, such as by touch, database information associated with the train icon is retrieved from the graphics database 155 and provided to the display 130. Referring to FIG. 19, such information could, for example, comprise information such as a train schedule. When the receiver 100 (FIG. 1) comprises a clock (not shown), the schedule could be displayed only for future times so that space on the display 130 is not wasted by presenting past information that may be only of minimal use to the person reading the display 130. FIG. 20 depicts the display of the graphic message "CALL HOME," which is conveyed by universally-understood images of a telephone and a house. FIG. 21 shows an example of information that can be displayed when the house icon is selected by the user. When the user touches the house, database information such as the address of the house and the telephone number can be retrieved from the graphics database 155 and displayed to remind the user of important information.

Figure 22:
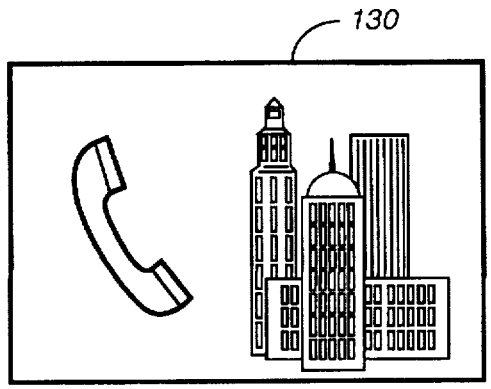
Figure 23:
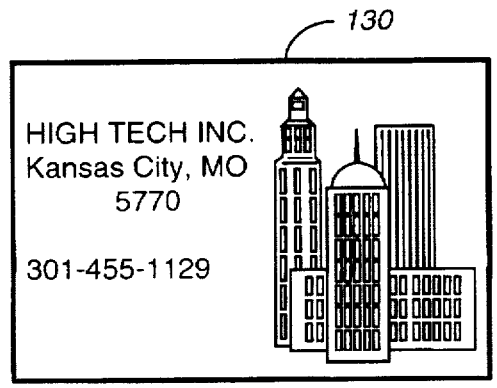

FIGS. 22 and 23 show the use of other information in addition to that provided by the graphic message. In FIG. 22, the graphic message "CALL THE OFFICE" or "CALL WORK" is presented solely by graphic images. When the user touches the office, or otherwise selects the office image, information about the office is presented. Such information can include, for example, the address and telephone number associated with the office.

Preferably, stored information, such as that in the graphics database 155, can be programmed into the data communication receiver 100 in a number of ways. For example, information could be entered via the controls 140 or via a data port (not shown) coupled to the processor 120. Alternatively, programming information could be provided to the data communication receiver 100 over the air for reception by the receiver 110. When information is programmed over the air, the user need not suffer the inconvenience of having to take the data communication receiver 100 into a service shop. Instead, information can be frequently updated without ever disturbing the user.

In summary, the data communication receiver as described above receives messages then, in response to predetermined information included in the received messages, displays graphic messages to the user to convey an easily understood, universal message. According to the present invention, this can be done by transmitting predetermined codes to the data communication receiver. Codes in a received message are looked up in a graphics memory to retrieve image data associated with the codes, then an image or a sequence of images is advantageously presented on a display to convey a universally understood message. For example, two images, e.g., a telephone and a house, can be displayed together on the screen to convey the message "CALL HOME." This message will be understood regardless of the language spoken by the user of the data communication receiver. Alternatively, if a text message is desired, the text message can be displayed along with a supplemental image that reinforces the message.

Also, other important information associated with the images forming the graphic messages can be conveniently stored and selectively presented to the user. This additional information could comprise, for example, train schedules associated with a train image, a description of a cafeteria menu associated with a food platter image, an address associated with an office image, etc. The user can easily access this information by selecting the icon, such as by touching the screen or highlighting the icon with a cursor.

It will be appreciated by now that there has been provided a method and apparatus for providing universal messages that can be understood regardless of languages spoken by the user of a data communication receiver.

What is claimed is:

1. A method for displaying messages in a data communication receiver, the method comprising the steps of:
   receiving an alphanumeric message;
   receiving a programming message that includes a key word and image data;
   storing the key word and the image data in the database;
   referencing a database to determine whether at least one word included in the alphanumeric message matches at least one key word included in the database, wherein the at least one key word is associated with image data that is representative of at least one image;
   presenting, when the alphanumeric message includes at least one word that matches at least one key word located in the database, the at least one image as a graphic message that is accompanied by the alphanumeric message on a display; and
   presenting, when the alphanumeric message does not include at least one word that matches at least one key word located in the database, the alphanumeric message without an accompanying graphic message on the display.

2. The method of claim 1, wherein the step of receiving the programming message comprises the step of:
   receiving the programming message as a radio signal.

3. The method of claim 1, wherein the step of receiving the programming message comprises the step of:
   receiving the programming message through use of controls on the data communication receiver.

4. A data communication receiver for presenting information, the data communication receiver comprising:
   a receiver for receiving an alphanumeric message including at least one word;
   a database for storing key words and image data associated with the key words;
   a presentation element coupled to the receiver and the database for determining whether at least one word included in the alphanumeric message matches at least one key word included in the database, wherein the image data associated with the at least one key word is representative of at least one image;
   a display coupled to the presentation element for presenting, when the at least one word matches at least one key word, the at least one image as a graphic message accompanied by the alphanumeric message, and for presenting, when the at least one word does not match at least one key word; the alphanumeric message without an accompanying graphic message;
   controls coupled to the processor for providing user-initiated commands thereto, wherein presentation of the alphanumeric message and any accompanying graphic message occurs in response to reception of a display command; and
   programming means coupled to the processor and to the database for programming the database, the programming means further comprising:
      the receiver for receiving a programming message including a key word and image data;
      a memory for storing a programming word; and
      storing means for storing the key word and the image data in the database in response to determining that the programming message includes the programming word.

5. A data communication receiver for presenting information, the data communication receiver comprising:

a receiver for receiving an alphanumeric message including at least one word;

a database for storing key words and image data associated with the key words;

a presentation element coupled to the receiver and the database for determining whether at least one word included in the alphanumeric message matches at least one key word included in the database, wherein the image data associated with the at least one key word is representative of at least one image;

a display coupled to the presentation element for presenting, when the at least one word matches at least one key word, the at least one image as a graphic message accompanied by the alphanumeric message, and for presenting, when the at least one word does not match at least one key word, the alphanumeric message without an accompanying graphic message;

controls coupled to the processor for providing user-initiated commands thereto, wherein presentation of the alphanumeric message and any accompanying graphic message occurs in response to reception of a display command; and programming means coupled to the processor and to the database for programming the database, the programming means further comprising:

controls for receiving a programming message comprising a key word and image data; and storing means for storing the key word and the image data in the database.

6. A data communication receiver for presenting information, the data communication receiver comprising:

a receiver for receiving a message;

a decoder coupled to the receiver for decoding the message to recover one or more alphanumeric words therefrom;

a memory coupled to the decoder for storing the message;

a database coupled to the decoder for storing a plurality of key words and image data associated therewith, the image data representative of images;

a presentation element coupled to the database for determining whether at least one alphanumeric word included in the message matches at least one key word included in the database; and a display coupled to the presentation element for presenting, when at least one alphanumeric word matches at least one key word, a corresponding image as a graphic message accompanied by the message, and for presenting, when at least one alphanumeric word does not match at least one key word, the message unaccompanied by any graphic messages.

* * * * *